(12) United States Patent
McCay

(10) Patent No.: US 6,394,720 B1
(45) Date of Patent: May 28, 2002

(54) STRAP ASSEMBLY

(75) Inventor: Gary Jeffrey McCay, Chippendale (AU)

(73) Assignee: McCay Holdings Pty. Ltd., Chippendale (AU)

( * ) Notice: Subject to any disclaimer, the term of this patent is extended or adjusted under 35 U.S.C. 154(b) by 0 days.

(21) Appl. No.: 09/582,754

(22) PCT Filed: Jan. 18, 1999

(86) PCT No.: PCT/AU99/00026

§ 371 (c)(1),
(2), (4) Date: Jun. 30, 2000

(87) PCT Pub. No.: WO99/35933

PCT Pub. Date: Jul. 22, 1999

(30) Foreign Application Priority Data

Jan. 16, 1998 (AU) .............................................. PP1339
Jun. 1, 1998 (AU) .............................................. PP3850

(51) Int. Cl.[7] .................................................. B60P 7/08
(52) U.S. Cl. ........................................ 410/100; 410/97
(58) Field of Search ............................. 410/12, 97, 100; 24/680 D, 300, 301, 302, 265 CD; 224/413, 436, 534, 563; 248/499

(56) References Cited

U.S. PATENT DOCUMENTS

| | | | |
|---|---|---|---|
| 2,913,216 A | * 11/1959 | Davis ........................... 410/97 |
| 4,111,132 A | * 9/1978 | Plut ............................. 410/97 |
| 5,165,584 A | 11/1992 | Meagher et al. | |
| 5,423,644 A | * 6/1995 | First, Sr. ...................... 410/100 |
| 5,603,591 A | * 2/1997 | McLellan ...................... 410/97 |
| 5,800,106 A | * 9/1998 | Miller ....................... 410/100 X |
| 6,032,916 A | * 7/2000 | Holliday ................... 24/302 X |

FOREIGN PATENT DOCUMENTS

| | | |
|---|---|---|
| AU | 29132/77 | 4/1979 |
| AU | 80406/82 | 6/1982 |
| DE | 31 22 882 | 1/1983 |
| WO | WO 93/00028 | 1/1993 |

* cited by examiner

Primary Examiner—Stephen T. Gordon
(74) Attorney, Agent, or Firm—Young & Thompson (57) ABSTRACT

A strap assembly comprising a first section (10) made from flat shock cord (11) having a loop (12) at one end and a female sectoin (13) of a side release buckle at the opposite end, and a second section (14) made from flat webbing (15) having a loop (16) and fitted with a pull through male section (17) of a side release buckle that can be connected to the female section (13) in the usually way to form the strap assembly according to the present invention. Thus the section (18) of webbing can be used to tighten the strap assembly against the tension of the shock cord (11).

15 Claims, 6 Drawing Sheets

STRAP ASSEMBLY

TECHNICAL FIELD OF THE INVENTION

THIS INVENTION relates to a strap assembly and in particular to a strap assembly suitable for adjustable application to holding down a load on a supporting bed.

BACKGROUND ART

There are general problems associated with systems for holding down loads. Ropes are commonly used. Various and numerous arrangements of straps and buckles are also known.

Problems also arise when holding down loads on various kinds of vehicles. Particular problems arise where the nature of the load or vehicle may cause loosening of the holding down ropes or straps, for example where the load is compressible or where air is progressively expelled after tightening. For example, motorcyclists frequently use straps made from cord known as shock cord to hold a load on the pillion seat of the motorcycle. Straps of this type employ a rubber cord restrained inside a webbing to form a cylindrical cord, metal hooks are fitted at each end. The problem with these cords is that they are not adjustable and the metal hooks are dangerous.

An alternative is to use simple webbing tightened using buckles but this is also subject to difficulties. The pillion seat is cushioned so there is a latent effect due to air being expelled from the seat and this causes loosening of the webbing. Also vibration causes further loosening.

These types of problems are common to many situations although loosening can occur due to rope stretch and knot tightening and so on.

There are an enormous number and variation of strap assemblies including those that are dedicated to particular applications.

Australian Patent Application No. 29132/77 describes a device formed as a metal plate to be used as a tightening device in conjunction with an inextensible strap. This arrangement relies on the inextensibility of the strap and a lever action to tighten the strap.

Australian Patent No. 521966 describes a plastic coated multi-strand steel cable with rigid eyelets at each end which enables a surf board, snow skis, sail boards or the like to be secured to a vehicle roof rack. This arrangement is primarily for security purposes. It is not suitable to low cost straps for general application.

Australian Patent Application No. 20102/92 describes a specific strap arrangement for a closed umbrella or similar elongate article that enables that umbrella to be carried about the shoulder of a person using the strap. This is a typical example of a strap assembly designed for a specific application.

Australian Patent Application No. 61265/94 and U.S. Pat. No. 5,165,584 are also directed to shoulder strap assemblies for particular application with the second mentioned patent being directed to a specific strap assembly for use as a bow carrying device. The latter arrangement has an elasticised section for the purpose of being secured around the bow. Again, due to its specialised application this strap assembly is not suited to general application for holding down loads.

German Patent Specification No. DE3122882 describes a retaining strap for a self loading trailer. The retaining strap has plastic fibre end loops and an elastic centre section. The fitting loops at each end of the strap are made by crimping metal sleeves over the loop ends with similar sleeves crimped over overlapping ends of the plastic fibre strap and the elastic middle section. Again, this strap assembly has particular application to a self loading trailer where high levels of tension can damage and break the ends as the load is being pressed into the trailer. The elastic middle section will ensure a secure hold for the load and is utilised to ensure that the end fittings are not damaged during the loading process. The loops generally require reinforcement by metal sleeve inserts to prevent the loops being cut by chaffing. Thus the strap essentially employs rigid loops formed by metal sleeve inserts and metal crimping at the loop connections and the connections to the elastic fibre. While this arrangement is suitable for the self-loading trailer application, as for the case of other straps mentioned above, this type of construction has not gained general application for holding down loads for safety reasons.

It is an object of the present invention to provide a strap assembly that has general application and particularly to general domestic use.

OUTLINE OF THE INVENTION

In one broad form the invention resides in a strap assembly comprising a first strap having a first end and a second end opposite the first end, the first end having a strap pass through loop of flexible webbing, there being an intermediate section between the first and second ends, the intermediate section comprising at least in part a length of elastic cord and there being an attachment means at or adjacent to the second end. Either end of the first strap may have additional sections of strap secured thereto. Preferably the attachment means comprises a fastener secured to the second end.

In one embodiment the first end includes a fastener attached to said loop.

Preferably the elastic cord is flat and includes a web covered elastic cord profiled to inhibit cross-sectional distortion.

In another embodiment the second end also includes a flexible loop.

In a further embodiment a fastener is provided at both ends of the strap assembly.

In another aspect the strap assembly includes a second strap having a loop at one end, a free end and an adjustment means intermediate the ends of the second strap, the adjustment means being securable to the attachment means of the first strap.

In another preferred form the strap assembly includes a second strap having a loop at one end, a free end and an adjustment means intermediate the end of the second strap, the adjustment means being securable to the attachment means of the first strap, the loop of the second strap being common to the first and second straps.

In one preferred form the invention comprises a strap assembly having at least one loop of inextensible webbing, a length of elastic cord connected to the loop of webbing and an attachment means opposite the loop. Preferably the strap assembly comprises a pair of loops secured at opposite ends of a length of elastic cord, each loop having an attachment means. Preferably the attachment means are attachable together as complementary halves of a buckle clip or the like.

In one preferred embodiment the invention comprises a strap assembly comprising a first strap section and a second strap section, the first strap section comprising shock cord and the second strap section comprising an adjustable webbing section so that the first strap section can be used to place the strap assembly in use under tension and the second strap section can be used to adjust the strap assembly and thereby provide the initial tension to the first strap section.

The shock cord providing the first strap section is preferably made as a flat shock cord having an elastic section retained within webbing confining the extension of the first strap section, the elastic section having a generally rectangular profile, the rectangular profile having rounded ends inhibiting lengthwise deformation of the shock cord over time. Thus, the shock cord retains its flat shape due to the rounded ends of the profile.

The two strap sections are preferably connected together using respective buckle parts, the webbing section having an adjustable buckle part of the pull through automatic tightening type and being connectable to the buckle part on the shock cord section. Typically each section includes a loop at one end and a buckle part opposite or spaced from the loop. The webbing extends through the buckle and is used to tighten the strap assembly about a load.

In one application of the invention there is provided securable to the first strap a second strap, the second strap having a loop at one end, a free end and an adjustment means intermediate the ends of the second strap, the strap assembly capable of being wrapped around a load on a pillion seat of a motorcycle, the pillion seat having opposite sides, the loop of the first end of the first strap being secured to the motorcycle on one side of the pillion seat, and the loop of the second strap being secured to the motorcycle on the opposite side of the pillion seat, the adjustment means of the second strap being secured to the attachment means of the first strap and the free end of the second strap being used to tension the strap assembly to secure the load to the pillion seat of the motorcycle.

In a second application there is provided a second strap securable to the first strap, the second strap having a loop at one end, a free end and an adjustment means intermediate the ends of the second strap, the strap assembly capable of being wrapped around a load on a load carrier, the load carrier having opposite sides, the loop of the first strap being secured to the load carrier on one side and the loop of the second strap being secured to the load carrier on the opposite side of the load carrier, the adjustment means of the second strap being secured to the attachment means of the first strap and the free end of the second strap being used to tension the strap assembly to secure the load to the load carrier.

In a further application there is provided a second strap securable to the first strap, the second strap having a loop at one end, a free end and an adjustment means intermediate the ends of the second strap, the strap assembly capable of being wrapped around a load on a load carrier, the loop of the first end of the first strap being secured to the loop of the second strap by passing one of said straps through the loop of the other strap, the adjustment means of the second strap being secured to the attachment means of the first strap and the free end of the second strap being used to tension the strap assembly to secure the load to the load carrier.

In a still further application there is provided a second strap the second strap having a loop at one end, a free end and an adjustment means intermediate the ends of the second strap, the strap assembly capable of being wrapped over a surfboard, sailboard or the like, positioned on a roof rack of a vehicle, the loop of the first strap being secured to the roof rack on one side of the surfboard and the loop of the second strap being secured to the roof rack on the opposite side of the surfboard, the adjustment means of the second strap being secured to the attachment means of the first strap and the free end of the second strap being used to tension the strap assembly to secure the surfboard to the roof rack.

In another application the second end of the first strap includes a flexible loop, the attachment means comprising a fastener secured to the loop of the second end, the first end having a fastener secured to the loop of the first end, the strap assembly further comprising a second strap having loops at opposite ends and a third strap having loops at opposite ends, the second and third straps having respective fasteners secured to each of their loops, the straps capable of being wrapped around a load to secure it to a load carrier, one of said straps being adapted to have one end pass through the loop of its opposite end after being passed around the load carrier in order to secure the straps to the load carrier at a first point, another one of said straps being secured the same way to the load carrier at a point spaced from the first point, the first and second points being on opposite sides of the load, the fasteners of the last of the three straps being connected to respective ones of the fasteners of the other straps in order to secure the load to the load carrier.

BRIEF DESCRIPTION OF THE DRAWINGS

In order that the present invention can be more readily understood and be put into practical effect reference will now be made to the accompanying drawings which illustrate preferred embodiments and wherein.

METHOD OF PERFORMANCE

Referring to the drawings and initially to FIGS. 1 to 5 there is illustrated a strap assembly comprising a first section 10 made from flat shock cord 11 having a loop 12 at one end and a female section 13 of a side release buckle at the opposite end, and a second section 14 made from flat webbing 15 having a loop 16 and fitted with a pull through male section 17 of a side release buckle that can be connected to the female section 13 in the usual way to form the strap assembly according to the present invention. Thus the section 18 of webbing can be used to tighten the strap assembly against the tension of the shock cord 11.

Figures 1, 2:
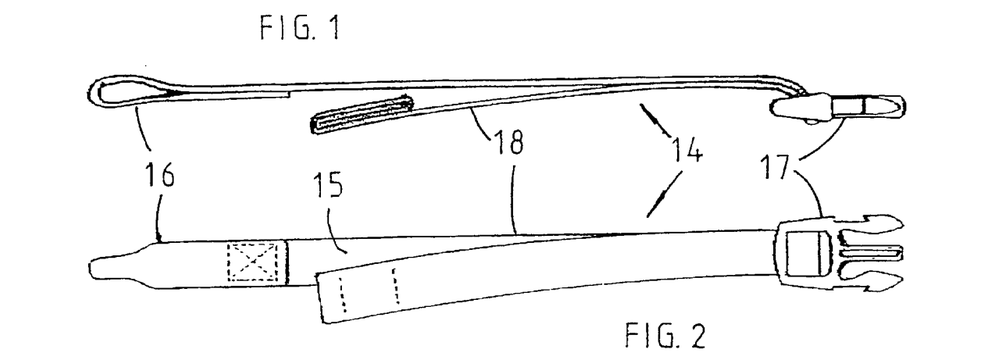
FIGS. 1 and 2 are respective edge and side views illustrating a webbing section of a strap assembly according to the present invention.
Figures 3, 4:
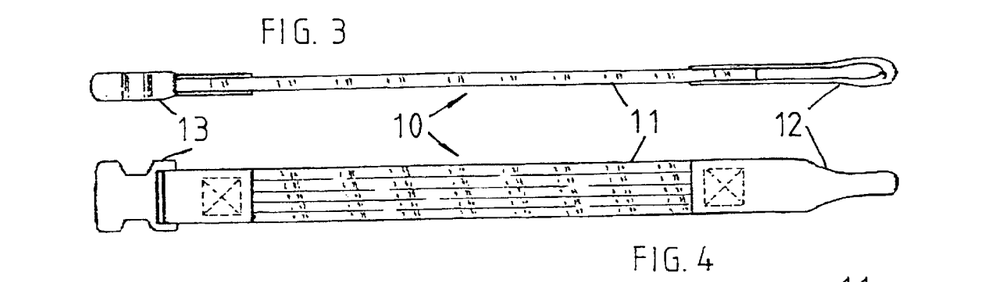
FIGS. 3 and 4 are respective edge and side views illustrating a shock cord section of a strap assembly according to the present invention.
Figures 5, 6:
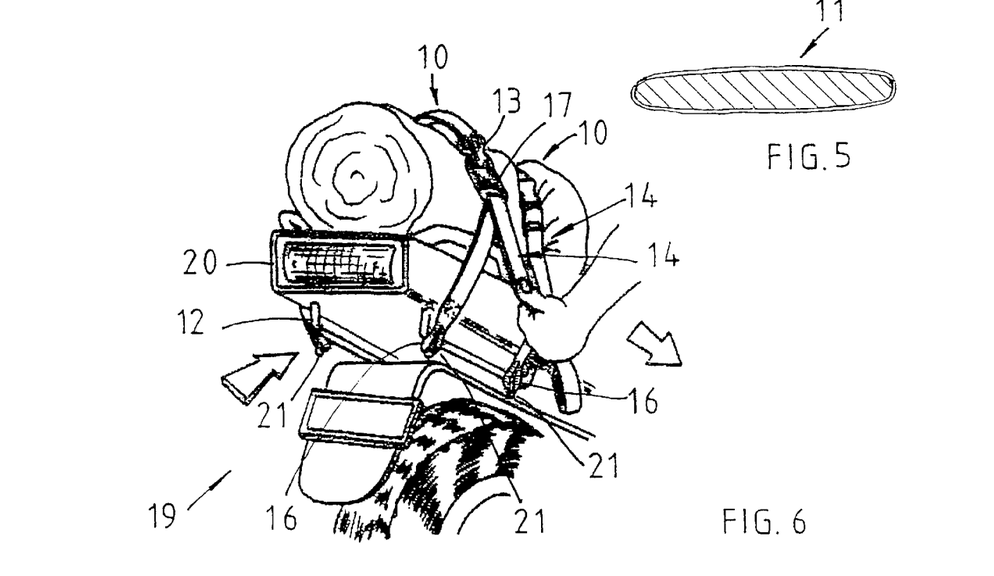
FIG. 5 is a section through the shock cord employed in the shock cord section of FIGS. 3 and 4.
FIG. 6 illustrates application of the present invention to a motorcycle.
Figure 8:
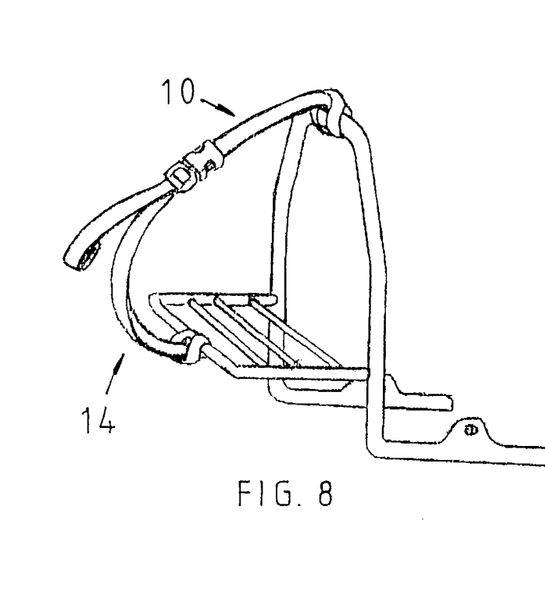
FIGS. 8 to 10 illustrate methods applying strap assemblies according to the present invention.
Figure 9:
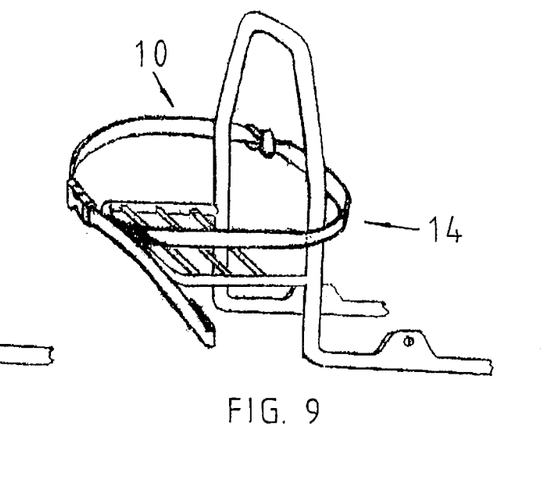
Figure 10:
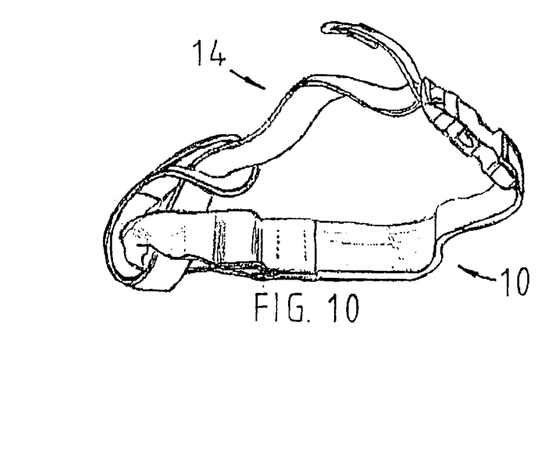

Referring to FIG. 6 there is illustrated the rear section of a motorcycle at 19. The motorcycle includes a cushioned rear seat 20 and is equipped with hooks 21 below the seat 20. The loops of the respective strap assembly sections are placed over the hooks as shown. Like numbers illustrate like features. As can be seen in FIG. 6 two strap assemblies according to the present invention are employed.

Where hooks are not available then the loops can be used as illustrated in FIGS. 8 to 10.

Figure 7:
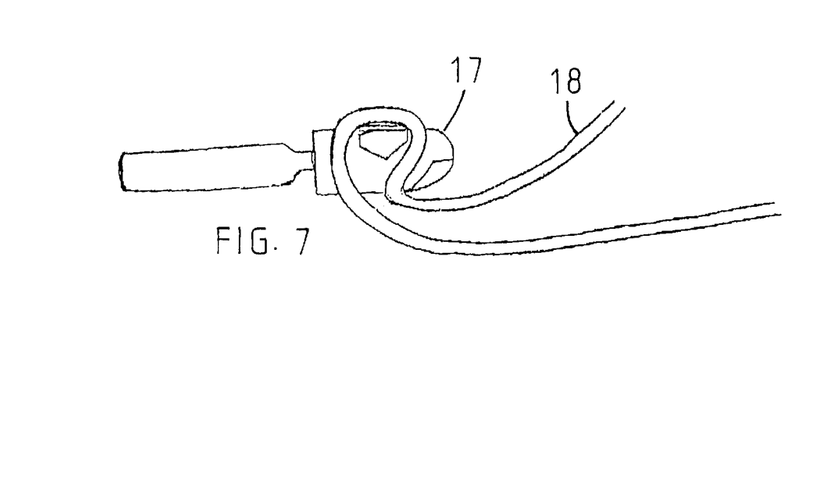
FIG. 7 illustrates operation of a typical pull through automatic tightening type buckle section suitable for use with the present invention.

FIG. 7 serves to illustrate the operation of the standard pull through tightening section of a side release buckle.

Figure 11:
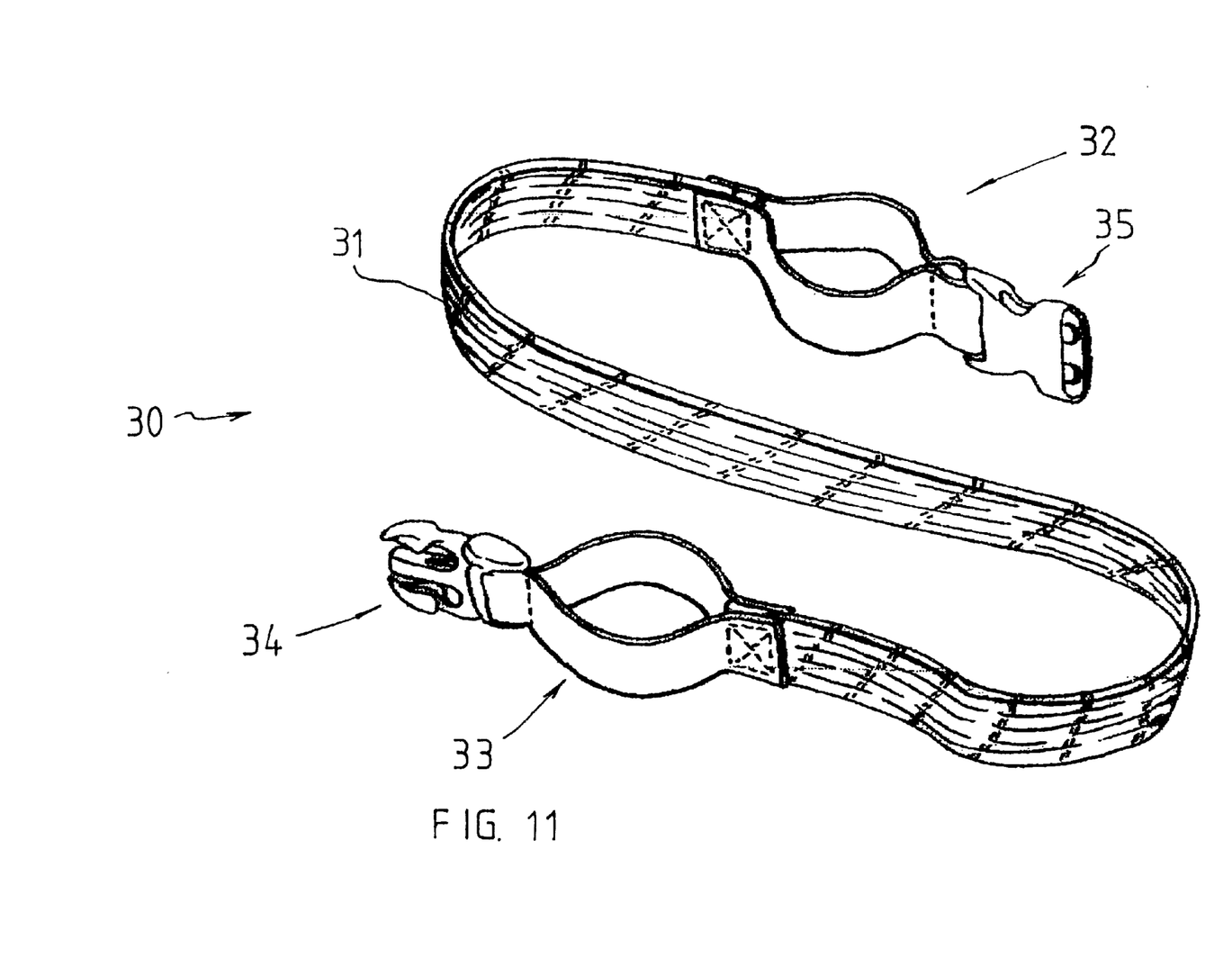
FIG. 11 is a perspective view illustrating another embodiment of the present invention.
Figure 12:
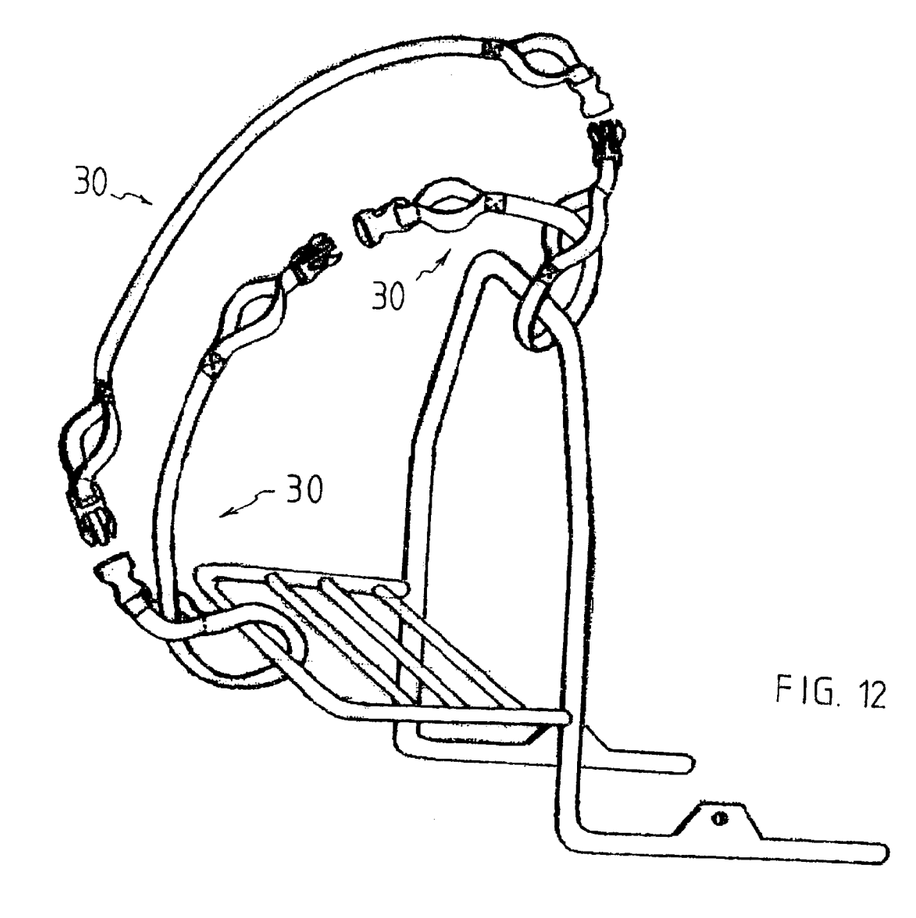
FIGS. 12 and 13 are perspective views illustrating how the embodiments of FIG. 11 may be used.
Figure 13:
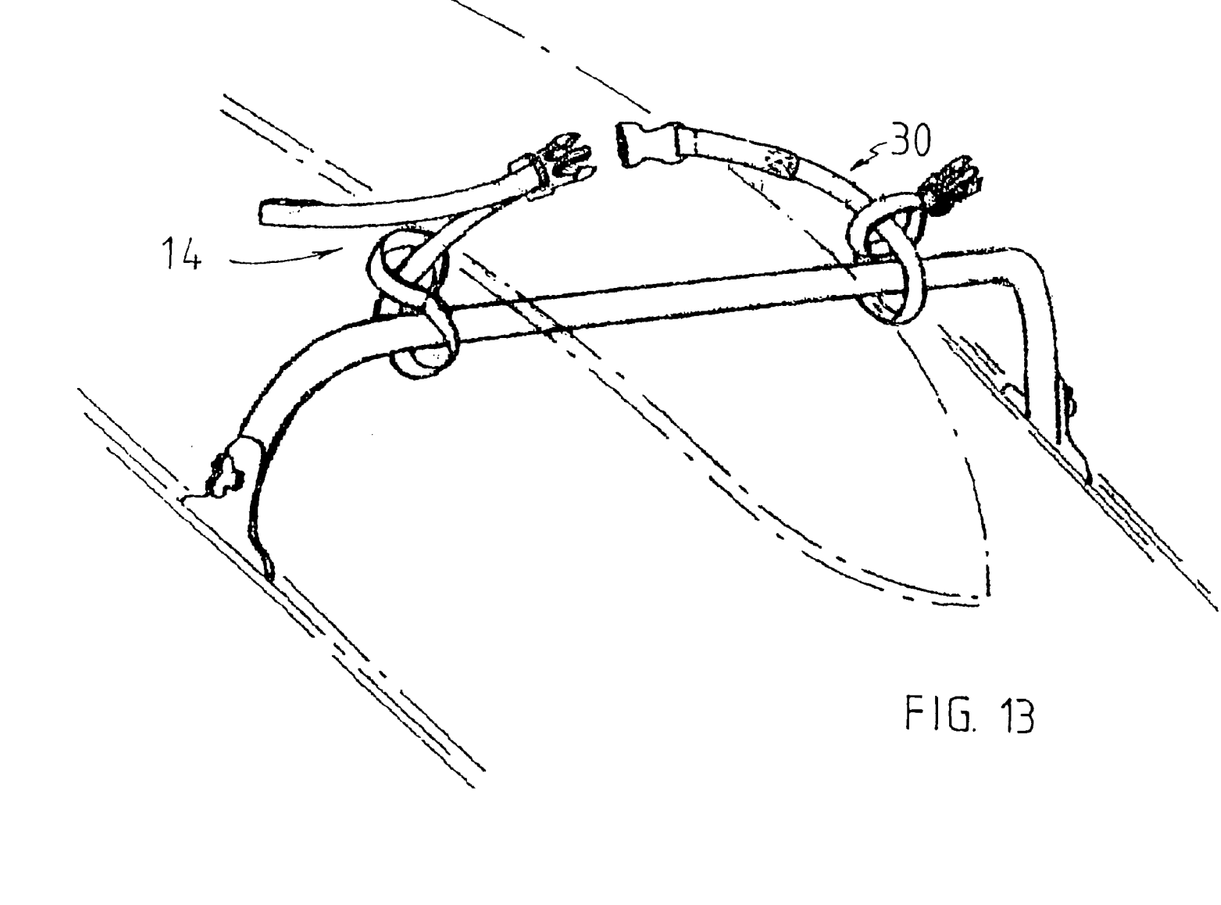

Referring to FIG. 11 there is illustrated a further embodiment of the present invention. In this case there is provided a strap assembly 30 comprising a length of shock cord 31 intermediate two loops 32 and 33. The loops 32 and 33 are made from inextensible webbing and have respective male and female sections 34 and 35 of a side release buckle secured in fixed relation to the loops as shown. The strap assembly can be used alone or in combination with other similar straps. Examples are given in FIG. 12 in relation to a bike rack and in FIG. 13 in relation to a car rack. The drawings are only schematic to show how the loops operate.

Figure 14:
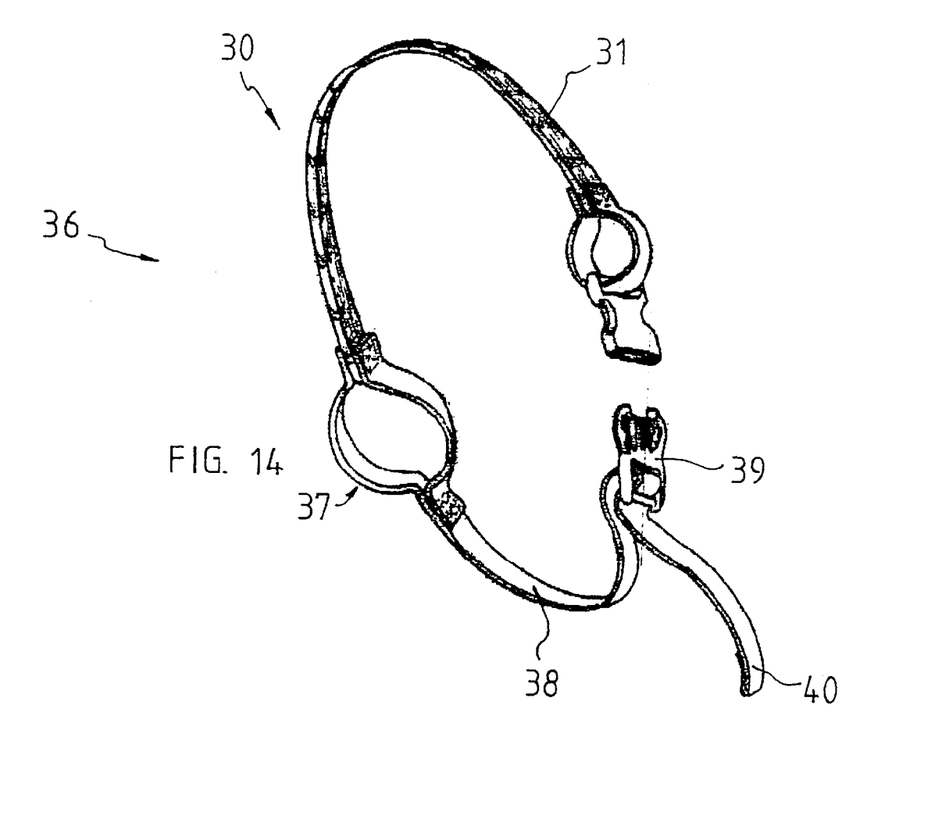
FIGS. 14 and 15 illustrate a further embodiment of the invention.
Figure 15:
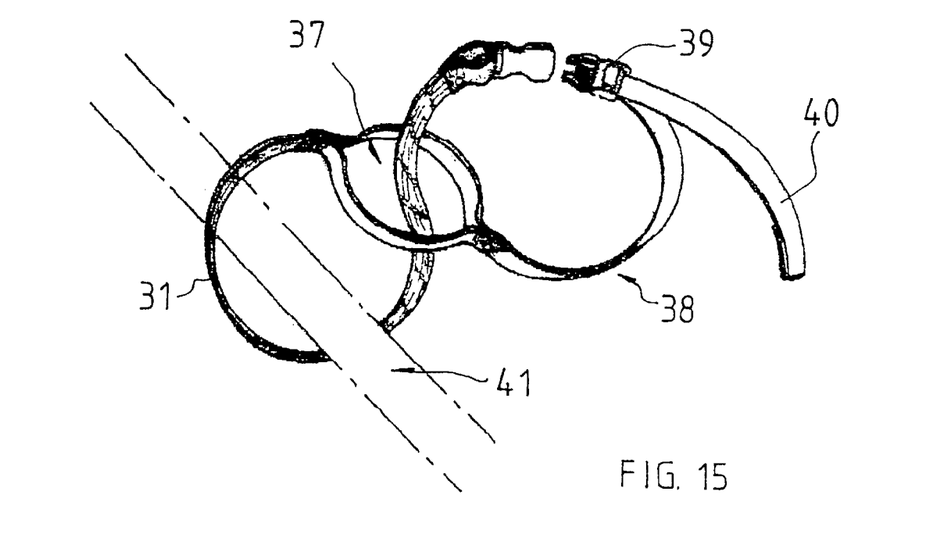

Referring to FIGS. 14 and 15 there is illustrated a further embodiment 36 of the invention. This embodiment is similar to FIG. 11 and like numerals have been used to illustrate like features. The difference is that one of the loops, in this case designated by the numeral 37, has a strap 38 of inextensible webbing so that the straps 31 and 38 share the loop 37. An adjuster buckle half 39 of a side release buckle is fitted to the strap 38 and the free end 40 is used to apply tension in the usual way. Use of the strap 38 with the strap pass through loop is illustrated schematically in relation to an imaginary load shown in broken outline at 41.

Whilst the above has been given by way of illustrative example of the present invention many variations and modifications thereto will be apparent to those skilled in the art without departing from the broad ambit and scope of the invention as set out in the appended claims.

The claims defining the invention are as follows:

1. A load hold down strap assembly comprising a first strap having a first end and a second end opposite the first end, the first end having a strap pass through loop of flexible webbing, there being an intermediate section between the first and second ends, the intermediate section comprising at least in part a length of elastic cord and there being one half of a quick release buckle at or adjacent to the second end.

2. A load hold down strap assembly according to claim 1 wherein the second end includes a flexible loop of inextensible webbing material and the first end includes a mating half of the said one half of a quick release buckle of the first strap and is secured to the loop of the first end.

3. A load hold down strap assembly according to claim 1 wherein the first end includes a second half of a quick release buckle attached to said loop, the second half being adapted to mate with the said one half of a quick release buckle.

4. A strap assembly according to claim 1 wherein the elastic cord is flat and includes a web covered elastic cord profiled to inhibit cross-sectional distortion.

5. A load hold down strap assembly according to claim 1 wherein the second end also includes a strap pass through loop of flexible webbing.

6. A load hold down strap assembly according to claim 1 wherein the second end of the first strap includes a strap pass through loop of flexible webbing, the said one half of the quick release buckle being secured to the loop of the second end, the first end having a fastener secured to the loop of the first end, the strap assembly further comprising a second strap having strap pass through loops at opposite ends and a third strap having strap pass through loops at opposite ends, the second and third straps having respective fasteners secured to each of their loops, the straps capable of being wrapped around a load to secure it to a load carrier, one of said straps being adapted to have one end pass through the loop of its opposite end after being passed around the load carrier in order to secure the one said strap to the load carrier at a first point, another one of said straps being securable the same way to the load carrier at a second point spaced from the first point, the first and second points being on opposite sides of the load carrier, the fasteners of the last of the three straps being connected to respective ones of the fasteners of the other straps in order to secure the load to the load carrier.

7. A load hold down strap assembly according to claim 1 further comprising a second strap having a loop at one end, a free end and an adjustment means intermediate the ends of the second strap, the adjustment means comprising a mating half of the said one half of a quick release buckle of the first strap.

8. A load hold down strap assembly according to claim 1 further comprising a second strap, the second strap having a loop at one end, a free end and an adjustment means intermediate the ends of the second strap, the strap assembly capable of being wrapped around a load on a pillion seat of a motorcycle, the pillion seat having opposite sides, the loop of the first end of the first strap being securable to the motorcycle on one side of the pillion seat, and the loop of the second strap being securable to the motorcycle on the opposite side of the pillion seat, the adjustment means of the second strap comprising a mating half of the said one half of a quick release buckle of the first strap and being securable to the said one half of a quick release buckle of the first strap and the free end of the second strap being useable to tension the strap assembly to secure the load to the pillion seat of the motorcycle.

9. A load hold down strap assembly according to claim 1 further comprising a second strap, the second strap having a loop at one end, a free end and an adjustment means intermediate the ends of the second strap, the strap assembly capable of being wrapped around a load on a load carrier, the load carrier having opposite sides, the loop of the first strap being securable to the load carrier on one side and the loop of the second strap being securable to the load carrier on the opposite side of the load carrier, the adjustment means of the second strap comprising a mating half of the said one half of a quick release buckle of the first strap and being securable to the said one half of a quick release buckle of the first strap and the free end of the second strap being useable to tension the strap assembly to secure the load to the load carrier.

10. A load hold down strap assembly according to claim 1 further comprising a second strap, the second strap having a loop at one end, a free end and an adjustment means intermediate the ends of the second strap, the strap assembly capable of being wrapped around a load on a load carrier, the loop of the first end of the first strap being securable to the loop of the second strap by passing one of said straps through the loop of the other strap, the adjustment means of the second strap comprising a mating half of the said one half of a quick release buckle of the first strap and being securable to the said one half of a quick release buckle of the first strap and the free end of the second strap being useable to tension the strap assembly to secure the load to the load carrier.

11. A load hold down strap assembly according to claim 1 further comprising a second strap, the second strap having a loop at one end, a free end and an adjustment means intermediate the ends of the second strap, the strap assembly capable of being wrapped over a surfboard positioned on a roof rack of a vehicle, the loop of the first strap being securable to the roof rack on one side of the surfboard and the loop of the second strap comprising a mating half of the said one half of a quick release buckle of the first strap and being securable to the roof rack on the opposite side of the surfboard, the adjustment means of the second strap being securable to the said one half of a quick release buckle of the first strap and the free end of the second strap being useable to tension the strap assembly to secure the surfboard to the roof rack.

12. A load hold down strap assembly according to claim 1, further comprising a second strap, the second strap having a loop at one end, a free end and an adjustment means intermediate the ends of the second strap, the strap assembly capable of being wrapped around a load on a pillion seat of a motorcycle, the pillion seat having opposite sides, the loop of the first end of the first strap being securable to the motorcycle on one side of the pillion seat, and the loop of the second strap being securable to the motorcycle on the opposite side of the pillion seat, the adjustment means of the second strap being a mating half of the said one half of a quick release buckle of the first strap and being securable to the said one half of a quick release buckle of the first strap and the free end of the second strap being useable to tension the strap assembly to secure the load to the pillion seat of the motorcycle, wherein the elastic cord is flat and includes a web covered elastic cord profiled to inhibit cross-sectional distortion.

13. A strap assembly according to claim 1 wherein the first end include a fastener attached to said loop, the elastic cord being profiled to inhibit cross-sectional distortion.

14. A load hold down strap assembly according to claim 1 wherein the second end includes a strap pass through loop of flexible webbing and the said one half of a quick release buckle is secured to the loop of the second end.

15. A load hold down strap assembly according to claim 1, further comprising a second strap, the second strap having a loop at one end, a free end and an adjustment means intermediate the ends of the second strap, the strap assembly capable of being wrapped around a load on a pillion seat of a motorcycle, the pillion seat having opposite sides, the loop of the first end of the first strap being securable to the motorcycle on one side of the pillion seat, and the loop of the second strap being securable to the motorcycle on the opposite side of the pillion seat, the adjustment means of the second strap being a mating half of the said one half of a quick release buckle of the first strap and being securable to the said one half of the quick release buckle of the first strap and the free end of the second strap being useable to tension the strap assembly to secure the load to the pillion seat of the motorcycle, wherein the elastic cord is flat and includes a web covered elastic cord having a profile that is rectangular with rounded ends to inhibit distortion.

* * * * *